US007710434B2

(12) United States Patent
Gu

(10) Patent No.: US 7,710,434 B2
(45) Date of Patent: May 4, 2010

(54) ROTATION AND SCALING OPTIMIZATION FOR MOBILE DEVICES

(75) Inventor: Chuang Gu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 11/755,082

(22) Filed: May 30, 2007

(65) Prior Publication Data

US 2008/0297532 A1 Dec. 4, 2008

(51) Int. Cl.

| | |
|---|---|
| ***G09G 5/02*** | (2006.01) |
| ***G09G 5/00*** | (2006.01) |
| ***H04N 7/00*** | (2006.01) |
| ***H04N 11/06*** | (2006.01) |
| ***H04N 9/74*** | (2006.01) |
| ***G06K 9/00*** | (2006.01) |
| ***G06K 9/32*** | (2006.01) |

(52) U.S. Cl. ....................... 345/589; 345/604; 345/591; 345/649; 345/660; 348/467; 348/488; 348/552; 348/580; 358/518; 382/167; 382/254; 382/296; 382/304

(58) Field of Classification Search ......... 345/589–591, 345/593, 600–601, 604, 606, 618–619, 629–630, 345/649–660, 548, 549, 557, 574; 348/441, 348/467, 488, 552, 553, 557, 580–584, 612, 348/630; 358/518–525; 382/167, 254, 276, 382/293

See application file for complete search history.

(56) References Cited

U.S. PATENT DOCUMENTS

| | | | | |
|---|---|---|---|---|
| 6,857,102 | B1 | 2/2005 | Bickmore et al. | |
| 6,965,388 | B2 | 11/2005 | Vale et al. | |
| 7,042,473 | B2 | 5/2006 | Lehtonen | |
| 2003/0231785 | A1* | 12/2003 | Rhoads et al. | 382/100 |
| 2004/0075671 | A1 | 4/2004 | Vale et al. | |
| 2004/0075673 | A1 | 4/2004 | Vale et al. | |
| 2004/0131043 | A1 | 7/2004 | Keller | |
| 2004/0155209 | A1* | 8/2004 | Struye et al. | 250/587 |
| 2005/0151963 | A1* | 7/2005 | Pulla et al. | 356/139.03 |
| 2005/0152002 | A1* | 7/2005 | Shirakawa et al. | 358/1.18 |
| 2005/0168566 | A1 | 8/2005 | Tada et al. | |
| 2005/0176470 | A1 | 8/2005 | Yamakawa | |
| 2006/0048051 | A1 | 3/2006 | Lazaridis | |
| 2006/0187503 | A1 | 8/2006 | Ahn | |
| 2007/0035706 | A1* | 2/2007 | Margulis | 353/122 |
| 2008/0094324 | A1* | 4/2008 | Richards | 345/84 |
| 2008/0095469 | A1* | 4/2008 | Kiser | 382/289 |

(Continued)

OTHER PUBLICATIONS

"ACDSee Mobile for Windows CE," http://www.programurl.com/acdsee-mobile-for-windows-ce.htm, pp. 1-3 (downloaded from the Internet on Apr. 30, 2007).

(Continued)

*Primary Examiner*—Wesner Sajous
(74) *Attorney, Agent, or Firm*—Merchant & Gould P.C.

(57) ABSTRACT

Image processing in mobile devices is optimized by combining at least two of the color conversion, rotation, and scaling operations. Received images, such as still images or frames of video stream, are subjected to a combined transformation after decoding, where each pixel is color converted (e.g. from YUV to RGB), rotated, and scaled as needed. By combining two or three of the processes into one, read/write operations consuming significant processing and memory resources are reduced enabling processing of higher resolution images and/or power and processing resource savings.

19 Claims, 7 Drawing Sheets

U.S. PATENT DOCUMENTS

2008/0198170 A1* 8/2008 Guha .......................... 345/532
2009/0123066 A1* 5/2009 Moriya et al. ............... 382/166
2009/0232352 A1* 9/2009 Carr et al. ................... 382/100

OTHER PUBLICATIONS

"Mobile Game Graphics—Overcoming the Small Screen Challenge," http://sw.nokia.com/id/efbc3add-2217-4e51-bdcb-ddb7961-cd9ad/Mobile _ Game _ Graphics _ Overcoming _ the _ Small_ Screen_Challenge_v1_0_en.pdf, pp. 1-5 (Jan. 16, 2007).

Guerrero, C., "Screen Rotation: Nyditot releases Windows Mobile 2003 compatible NVD 3.21," http://www.theunwired.net/?itemid=1467, pp. 1-2 (Aug. 17, 2003).

Powers, M., "Getting Started with Mobile 2D Graphics for J2ME," http://developers.sun.com/techtopics/mobility/midp/articles/s2dvg/index.html, pp. 1-7 (Aug. 2005).

* cited by examiner

ROTATION AND SCALING OPTIMIZATION FOR MOBILE DEVICES

BACKGROUND

Mobile devices have either landscape or portrait mode screens. Therefore, when the image or a single frame image from a video sequence is displayed in one of those specific screen orientations, a rotation operation may be needed in order to compensate the visual disorientation of the displayed image. Moreover, a size of an input image or video stream may be smaller or larger than the display screen size. In this case, scaling is typically performed in order to maximize the viewing space and to provide better user experience for image or video content.

Conventionally, rotation and/or scaling operations are carried out by separate scaling and rotation processes. This may be performed immediately after any image/video processing steps when the image or a single frame of video is ready to be scaled and/or rotated. The sequential processing practice has its disadvantages on system resources such as processor time and memory usage.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to optimizing image processing in mobile devices by combining color conversion, rotation, and scaling processes and performing operations for all three processes in a single step for each pixel reducing processor and memory usage for the image processing operations.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, overall performance of image rotation and scaling may be optimized in mobile devices by combining them with preceding image operations such as color conversion. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1A:
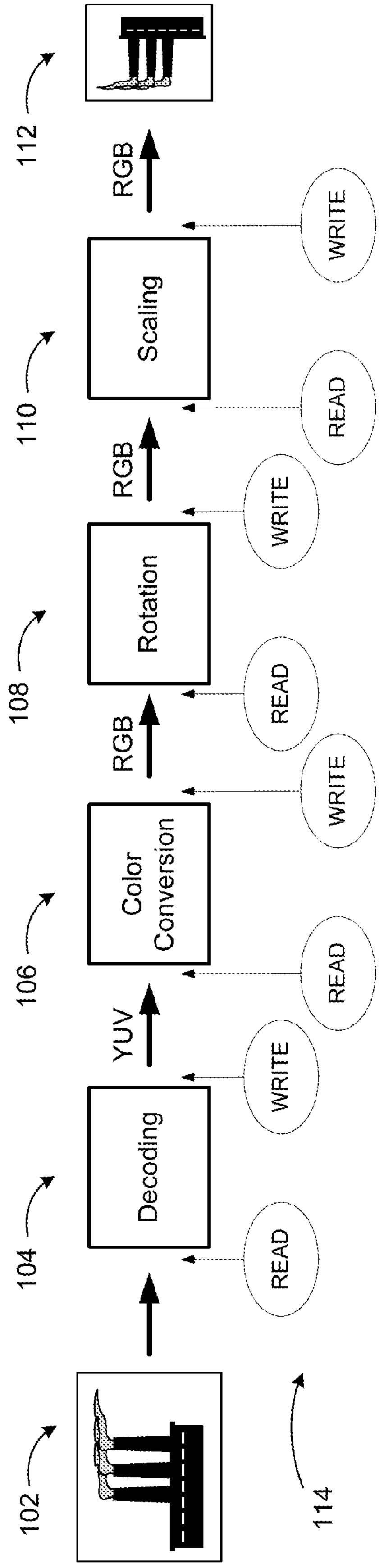
FIG. 1A illustrates steps of an example image processing operation in a mobile device for rendering a received image on the mobile device display.

Referring to FIG. 1A, steps of an example image processing operation in a mobile device for rendering a received image on the mobile device display are illustrated. As mentioned above, conventional rotation and/or scaling operations may be carried out by separate scaling and rotation processes. Thus, the data flow may look like:

[image/video processing]→[scaling]→[rotation]→scaled and/or rotated image

This sequential processing practice has its disadvantages on system resources such as processor time and memory usage. Assuming a width and height of the image are W and H, the total data size of an RGB24 color format may be W*H*3 bytes. The conventional practice may require two loops of W*H to process the scaling and rotation operation. At the same time, W*H*3 bytes of data have to go through memory bus by 2* W*H*3 bytes READ and 2*W*H*3 bytes WRITE. Because the data is usually much larger than D-cache size such as 16K or 32K bytes, the cache structure could be severally polluted. As a result, the performance may be poor for such normal practice.

Thus, the example operation in FIG. 1A begins with raw image 102 being received by an image or video codec of a mobile device, which typically uses YUV color space. The YUV model defines a color space in terms of one luma and two chrominance components. The YUV color model is used in many composite color video standards. YUV models human perception of color more closely than the standard RGB model used in computer graphics hardware.

Y stands for the luma component (the brightness) and U and V are the chrominance (color) components. There are a number of derivative models from YUV such as YPbPr color model used in analog component video and its digital child YCbCr used in digital video (Cb/Pb and Cr/Pr are deviations from grey on blue-yellow and red-cyan axes whereas U and V are blue-luminance and red-luminance differences).

YUV signals are created from an original RGB (red, green and blue) source. The weighted values of R, G and B are added together to produce a single Y signal, representing the overall brightness, or luminance, of a particular pixel. The U signal is then created by subtracting the Y from the blue signal of the original RGB, and then scaling; and V by subtracting the Y from the red, and then scaling by a different factor. This can be accomplished easily with analog circuitry.

An advantage of YUV resulting in its widespread use in image and video transmission is that some of the information can be discarded in order to reduce bandwidth. The human eye has fairly little color sensitivity: the accuracy of the brightness information of the luminance channel has far more impact on the image discerned than that of the other two. Understanding this human shortcoming, standards such as NTSC reduce the amount of data consumed by the chrominance channels considerably, leaving the eye to extrapolate much of the color. For example, NTSC saves only 11% of the original blue and 30% of the red. The green information is usually preserved in the Y channel. Therefore, the resulting U and V signals can be substantially compressed.

YUV is not an absolute color space. It is a way of encoding RGB information, and the actual color displayed depends on the actual RGB colorants used to display the signal. Therefore, a value expressed as YUV is only predictable if standard RGB colorants are used (i.e. a fixed set of primary chromaticities, or particular set of red, green, and blue).

On the other hand, the RGB color model is an additive model in which red, green, and blue (often used in additive light models) are combined in various ways to reproduce other colors. The name of the model and the abbreviation 'RGB' come from the three primary colors, red, green, and blue. The RGB color model itself does not define what is meant by 'red', 'green' and 'blue' (spectroscopically), and so the results of mixing them are not specified as exact (but relative, and averaged by the human eye).

In a conventional system such as the one illustrated in FIG. 1, color space conversion is required to change the color space from YUV space used by popular codecs such as JPEG, H.26x, MPEG, WMV/VC-1 to RGB color space. While specific color models and image formats are mentioned throughout this description, those are for illustration purposes only and do not constitute a limitation on embodiments. Various embodiments may be implemented with any image format or color model using the principles described herein.

The raw image is converted by the codec in decoding operation 104 and provided to a color conversion module in YUV color space. Color conversion operation 106 provides RGB data to a rotation module for rotating (108) the image as necessary, which is followed by scaling operation 110 by a scaling module. The scaling module provides color converted, rotated, and scaled image in RGB color space to a display driver module for rendering the color converted, rotated, and scaled image 112 on the mobile device display.

As indicated by reference numeral 114, a number of read and write operations occur during the image processing. Each step of the process requires reading the image from memory and then writing it back to the memory for the next step. Thus, significant amount of processing and memory resources are used for the image processing limiting a capability of the mobile device to process large amounts of image data (e.g. high resolution or high quality video).

While individual steps of the image processing operations are described as performed by individual modules above, the processing may be performed by a single or multiple software or hardware modules, or a combination of two. The below described embodiments are not limited to a single software module or hardware module implementation. Any combination of software and hardware may be used for implementing optimization of rotation and scaling of images in mobile devices.

Figure 1B:
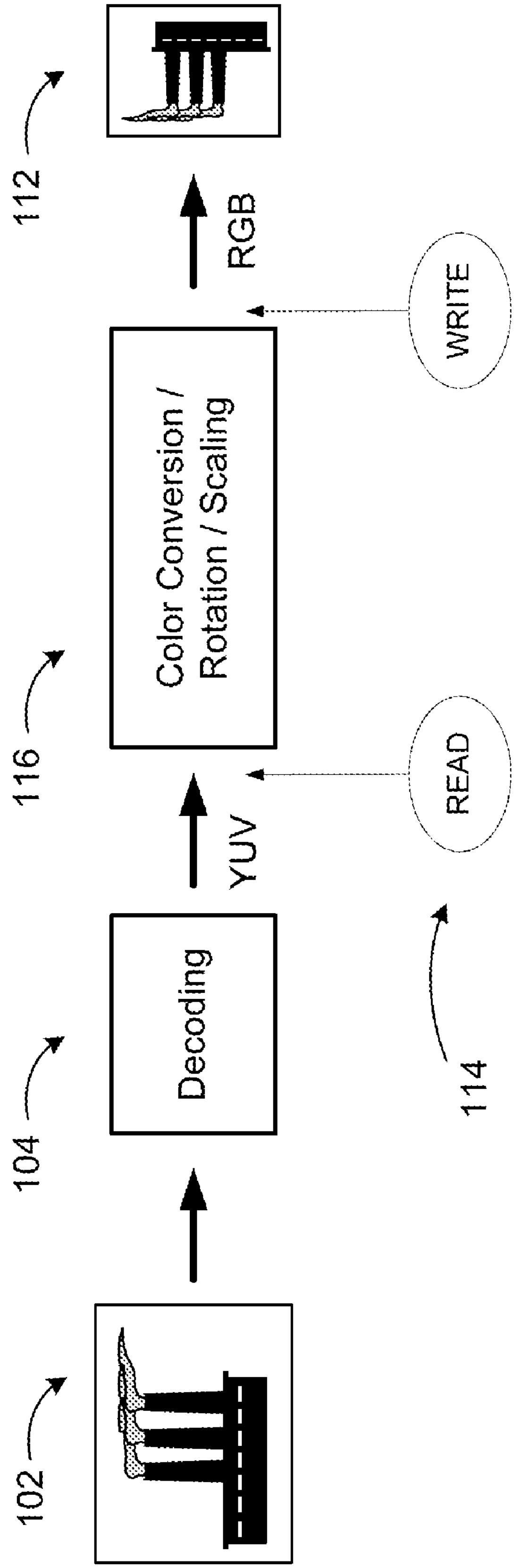
FIG. 1B illustrates steps of an image processing operation in a mobile device for rendering a received image on the mobile device display according to embodiments.

FIG. 1B illustrates steps of an image processing operation in a mobile device for rendering a received image on the mobile device display according to embodiments. According to some embodiments, the color conversion, rotation, and scaling operations may be combined into a single transformation operation reducing a number of read and write operations and thereby the usage of processing and memory resources significantly.

In the example process of FIG. 1B, raw image 102 is decoded (104) in YUV color space. The decoded image is read (114) by a combined transformation module and color conversion, rotation, and scaling operations are performed (116) together on each pixel. The color converted, rotated, and scaled image 112 in RGB color space is then provided to a display driver for rendering of the image. As a result, the read/write operations are reduced by a factor of three from the process of FIG. 1A.

While all three image processing operations are combined in FIG. 1B, embodiments are not so limited. Any number of the operations may be combined to reduce usage of processing and memory resources. For example, rotation and scaling operations may be combined into a single operation following color conversion or color conversion may be combined with rotation followed by scaling, etc. By reducing the number of read/write operations, additional performance improvements are enabled in the mobile device. For example, limited battery power may be saved significantly by running the processor less. Alternatively, higher resolution images or video may be processable and displayable by the mobile device through the reduction of processing and memory resource usage.

Figure 2:
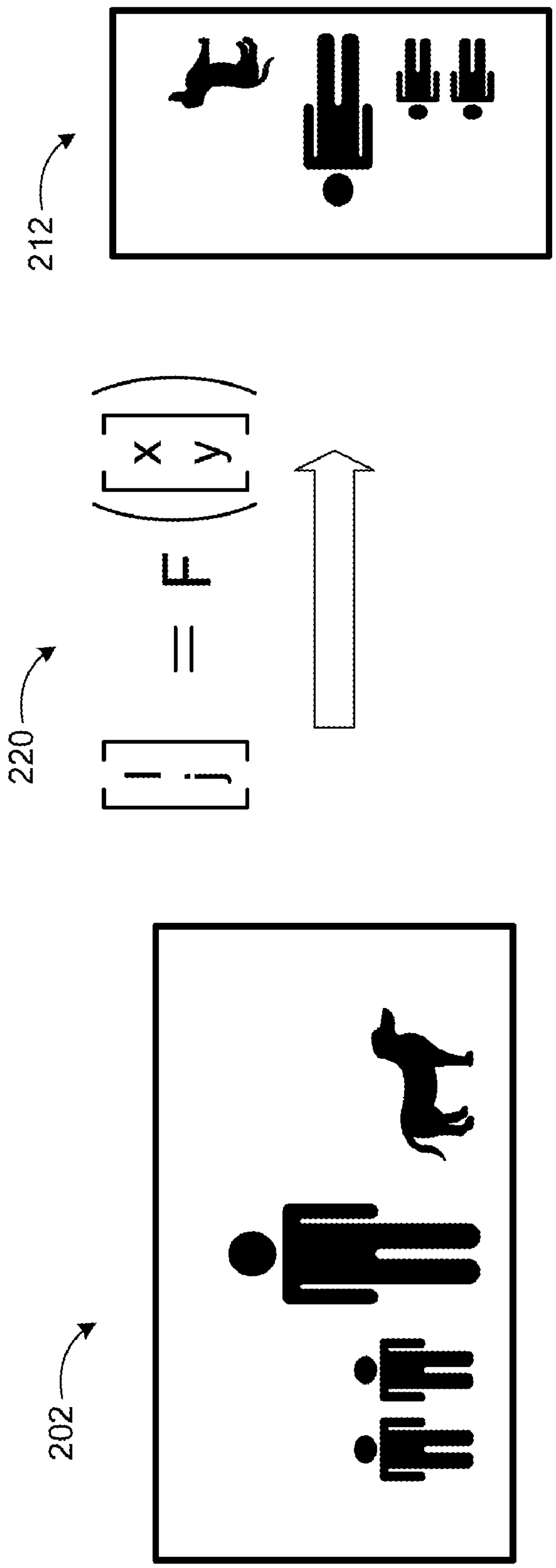
FIG. 2 illustrates an example image conversion according to embodiments that includes rotation and scaling of the image.

FIG. 2 illustrates an example image conversion according to embodiments that includes rotation and scaling of the image. As discussed above, the decoded input image 202 is represented by pixels each having a {YUV} data point in [x, y] location. An output image 212 of the transformation is the corresponding {RGB} data in [i, j] location for the same pixel regardless of the preceding decoding process. A single loop in the source YUV location is used to process all the data points one by one to the final destination RGB location. This transformation is shown in FIG. 2 by reference numeral 220.

Following is an example transformation. The color space conversion matrix formula may be provided as C=Y−16 D=U−128 E=V−128, where the RGB transformation is achieved by:

$$R=\text{clip}((298*C+409*E+128)>>8)$$

$$G=\text{clip}((298*C-100*D-208*E+128)>>8)$$

$$B=\text{clip}((298*C+516*D+128)>>8).$$

It should be noted that any other conversion standards such as ITU-R-BT.601 or ITU-R-BT.709 may also be implemented using the same principles. The resulting RGB data may also be further truncated into various different precision models such as RGB888, RGB565, or RGB555.

The geometric space conversion (i.e. scaling and rotation) may be described as an affine transformation such as:

$$i=ax+by+c;$$

$$j=dx+ex+f;$$

In the above formulas, {a, b, c, d, e, f} are parameters of the transform. Any rotation and scaling operation can be defined by a set of specific {a, b, c, d, e, f} parameters. For example, a size doubling and 90 degree rotation of the original image may be represented as:

RGB[y, x]=RGB[y, x+1 ]=RGB[y+1,x]=RGB[y+1,x+1]= RGB[x, y], where x and y represent data locations in the original {YUV} color space.

Embodiments may also be implemented using transformation other than the rigid affine transformation described above and combined with any color space conversion for each data point while the data is still in the data cache (D-cache).

The term "image" as used in this description refers to a still image or a frame of a video stream. As such the images may be in any format known in the art such as JPEG, MPEG, VC-1, and the like.

Figure 3:
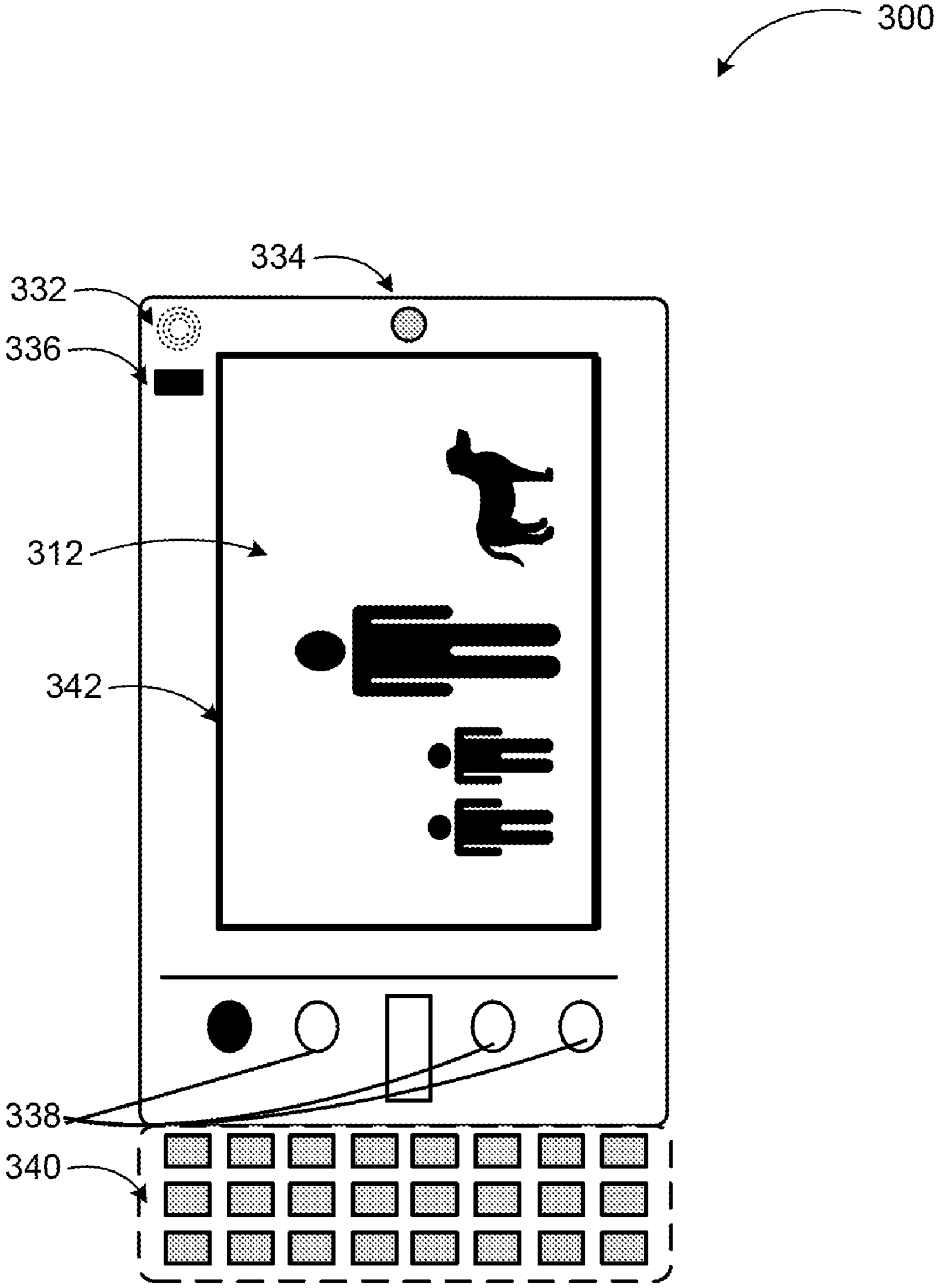
FIG. 3 illustrates an example mobile device displaying a rotated and scaled image according to embodiments.

FIG. 3 illustrates an example mobile device displaying a rotated and scaled image according to embodiments. Mobile device 100 may be any portable (or stationary) computing device with a display that is typically smaller in size, thereby requiring scaling and/or rotation of a received image for rendering.

Mobile device 300 is shown with many features. However, embodiments may be implemented with fewer or additional components. Example mobile device 300 includes typical components of a mobile communication device such as a hard keypad 340, specialized buttons ("function keys") 338, display 342, and one or more indicators (e.g. LED) 336. Mobile device 300 may also include a camera 334 for video communications and microphone 332 for voice communications. Display 342 may be an interactive display (e.g. touch sensitive) and provide soft keys as well.

Display 342 is inherently a smaller size display. In addition, due to space and available power constraints, certain capabilities (resolution, etc.) of the display may also be more limited than a traditional large display. Therefore, an image (or video stream) received by mobile device 300 may not be displayable in its original format on display 342. Furthermore, the received image may also be processed and/or formatted for optimized transmission. Thus, a codec module processes the received image generating a YUV color model version, which is then color converted, rotated, and scaled as necessary for rendering on display 342. As discussed above, the transformation comprising color conversion, rotation, and scaling may be performed in one operation reducing processing and memory usage significantly.

While specific file formats and software or hardware modules are described, a system according to embodiments is not limited to the definitions and examples described above. Optimization of rotation and scaling of images in mobile devices may be provided using other file formats, modules, and techniques.

Figure 4:
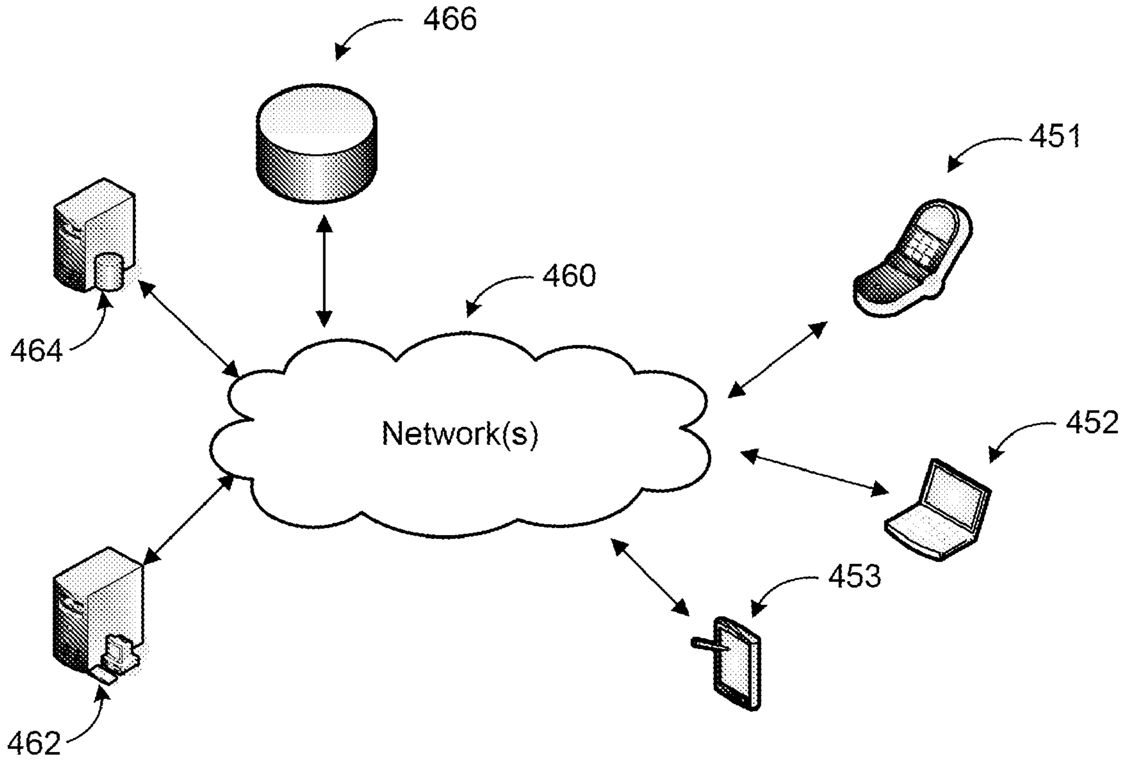
FIG. 4 is an example networked environment, where embodiments may be implemented.

FIG. 4 is an example networked environment, where embodiments may be implemented. Optimizing rotation and scaling operations on images in a mobile device may be implemented locally on a single computing device. The images (or video stream) to be processed may be received from one or more computing devices configured in a distributed manner over a number of physical and virtual clients and servers. They may also be implemented in un-clustered systems or clustered systems employing a number of nodes communicating over one or more networks (e.g. network(s) 460).

Such a system may comprise any topology of servers, clients, Internet service providers, and communication media. Also, the system may have a static or dynamic topology, where the roles of servers and clients within the system's hierarchy and their interrelations may be defined statically by an administrator or dynamically based on availability of devices, load balancing, and the like. The term "client" may refer to a client application or a client device. While a networked system implementing optimized rotation and scaling may involve many more components, relevant ones are discussed in conjunction with this figure.

An image transformation engine according to embodiments may be implemented as part of an image processing application in individual client devices 451-453. The image(s) may be received from server 462 and accessed from anyone of the client devices (or applications). Data stores associated with exchanging image(s) may be embodied in a single data store such as data store 466 or distributed over a number of data stores associated with individual client devices, servers, and the like. Dedicated database servers (e.g. database server 464) may be used to coordinate image retrieval and storage in one or more of such data stores.

Network(s) 460 may include a secure network such as an enterprise network, an unsecure network such as a wireless open network, or the Internet. Network(s) 460 provide communication between the nodes described herein. By way of example, and not limitation, network(s) 460 may include wired media such as a wired network or direct-wired connection, and wireless media such as acoustic, RF, infrared and other wireless media.

Many other configurations of computing devices, applications, data sources, data distribution systems may be employed to implement providing optimized image rotation and scaling in mobile devices. Furthermore, the networked environments discussed in FIG. 4 are for illustration purposes only. Embodiments are not limited to the example applications, modules, or processes.

Figure 5:
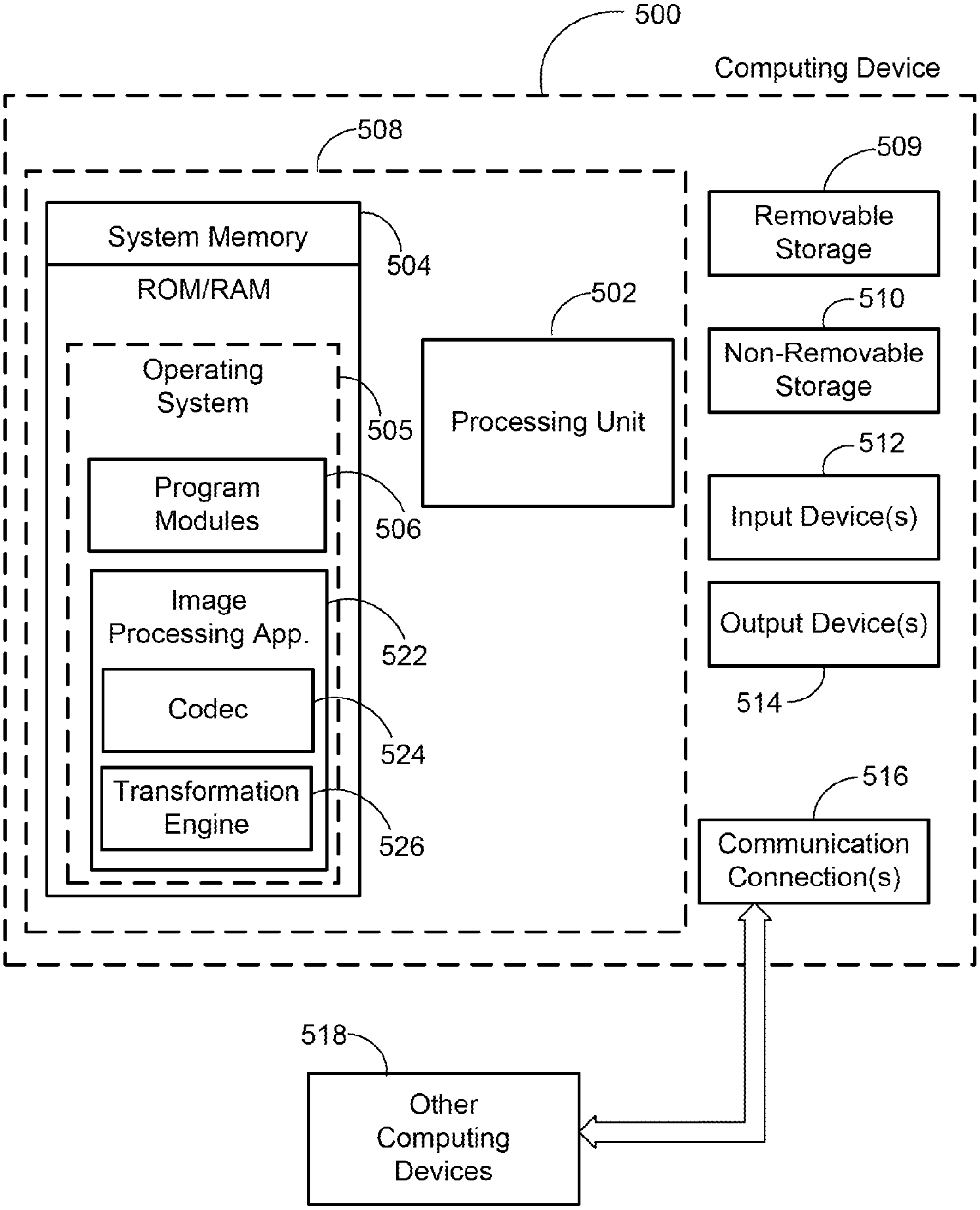
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment is illustrated, such as computing device 500. In a basic configuration, the computing device 500 may be a mobile device or a stationary computing device with a limited capability display providing optimized image rotation and scaling. Computing device 500 may typically include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of a networked personal computer, such as the WINDOWS® operating systems from MICROSOFT CORPORATION of Redmond, Wash. The system memory 504 may also include one or more software applications such as program modules 506, image processing application 522, codec 524, and transformation engine 524.

Image processing application 522 may be a separate application or an integral module of a desktop service that provides other services to applications associated with computing device 500. Codec 524 decodes received image files as discussed previously. Transformation engine 526 may provide combined color conversion, rotation, and scaling services for decoded images. This basic configuration is illustrated in FIG. 5 by those components within dashed line 508.

The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and non-volatile, removable and non-removable media implemented in any method or technology for storage of information, such as computer readable instructions, data structures, program modules, or other data. System memory 504, removable storage 509, and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as keyboard, mouse, pen, voice input device, touch input device, etc. Output device(s) 514 such as a display, speakers, printer, etc. may also be included. These devices are well known in the art and need not be discussed at length here.

The computing device 500 may also contain communication connections 516 that allow the device to communicate with other computing devices 518, such as over a wireless network in a distributed computing environment, for example, an intranet or the Internet. Other computing devices 518 may include server(s) that provide updates associated with the anti spyware service. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods of operation. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
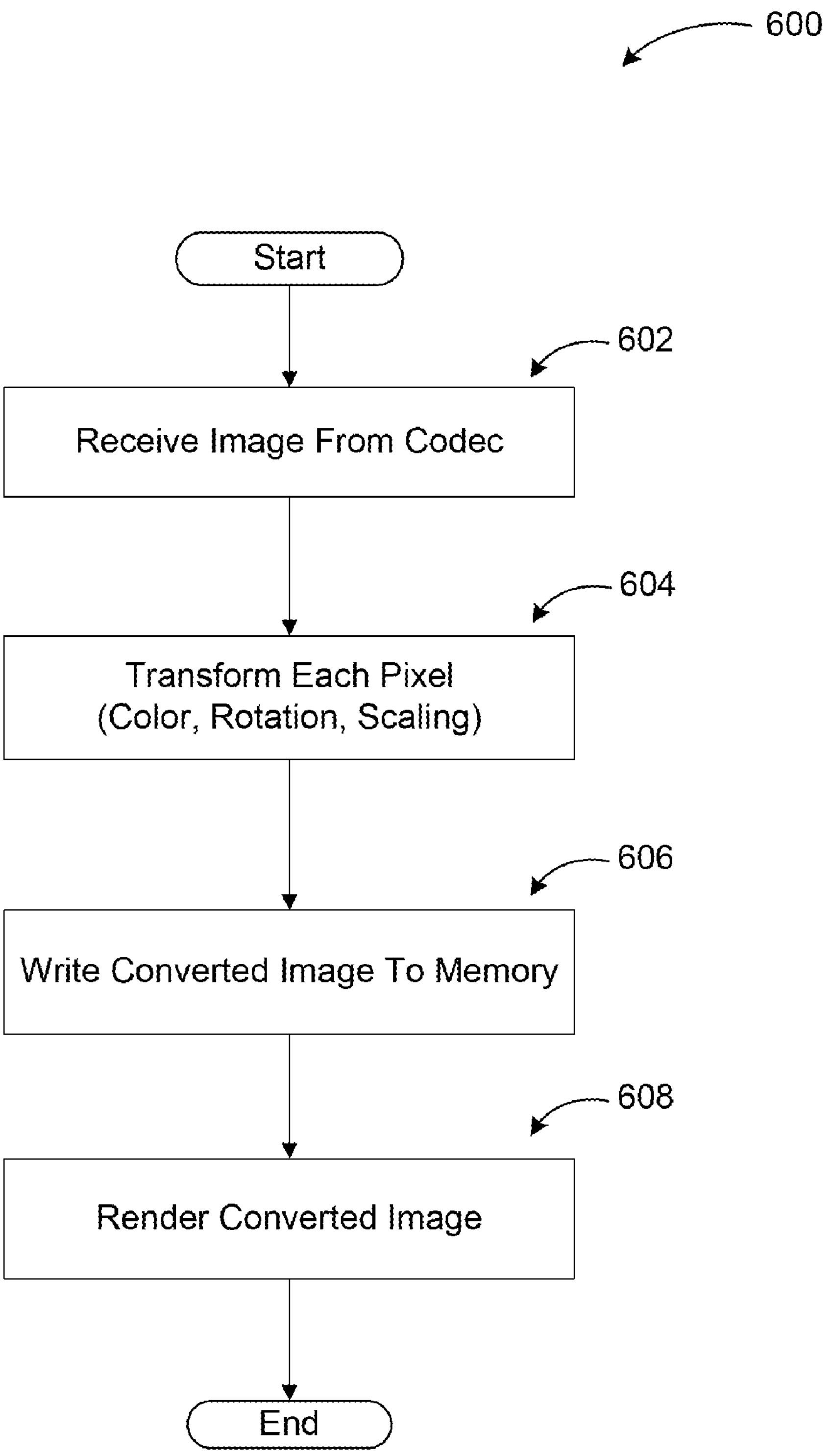
FIG. 6 illustrates a logic flow diagram of an image rotation and scaling optimization process according to embodiments.

FIG. 6 illustrates a logic flow diagram of an image rotation and scaling optimization process according to embodiments. Process 600 may be implemented as part of transformation engine in an image processing application.

Process 600 begins with operation 602, where a decoded image is received from a codec. As mentioned previously, the image may be a still image or a video stream frame in any format. Typically YUV color space is used by codecs, but other color models may also be used for transforming the received image to a converted image ready to be rendered on the mobile device display. Processing advances from operation 602 to operation 604.

At operation 604, a transformation is performed on the decoded image that includes a combination of color conversion, rotation, and scaling as needed. Any two of these processes or all three may be combined into a single operation that is performed on each pixel of the received image resulting in a color converted (typically RGB), rotated, and scaled image. Processing continues to operation 606 from operation 604.

At operation 606, the transformed image is written to the memory so that a display driver module can access it and render on the mobile device display. Processing continues to operation 608 from operation 606.

At operation 608, the transformed image is rendered on the mobile device display. After operation 608, processing moves to a calling process for further actions.

The operations included in process 600 are for illustration purposes. Providing optimized rotation and scaling of images in a mobile device may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for optimizing rotation and scaling operations on an image, the method comprising:

receiving an image to be rendered;

performing a transformation operation on the image that includes a combination of color conversion, rotation, and scaling, wherein the transformation is performed in a single loop on image data, wherein the color conversion comprises converting the received image from YUV color space to RGB color space by providing pixel location coordinates in the RGB color space to a rotation module for rotating the received image prior to a scaling operation performed by a scaling module for scaling the received image; and storing the transformed image data to be rendered on a display.

2. The method of claim 1, wherein performing the transformation in a single loop includes:

reading the image data from a cache memory;

performing the transformation on the image data pixel-by-pixel; and writing the transformed image data to the cache memory.

3. The method of claim 2, wherein the rotation and scaling transformation includes an affine transformation using:

$$i=ax+by+c;$$

$$j=dx+ey+f;$$

where x and y are pixel location coordinates in the YUV color space, i and j are pixel location coordinates in the RGB color space, and {a, b, c, d, e, f} are parameters defining a rotation angle and a scaling coefficient.

4. The method of claim 2, wherein the rotation and scaling transformation includes a non-affine transformation.

5. The method of claim 1, further comprising:

decoding the received image data prior to performing the transformation operation.

6. The method of claim 5, wherein the decoded image data is in the YUV color space.

7. The method of claim 6, wherein the transformed image data is in the RGB color space.

8. The method of claim 1, wherein the rotation and the scaling operations are performed to automatically adjust the received image to be rendered on a mobile device display.

9. The method of claim 1, wherein the image includes at least one from a set of: a still image, a video stream frame, and a graphic.

10. A system for optimizing rotation and scaling operations on an image, the system comprising:

a cache memory;

a processor coupled to the memory, wherein the processor is configured to execute program modules including:

an image processing application that includes:

a transformation module configured to:

read decoded image data associated with a received image from the cache memory;

perform a transformation operation on the decoded image data that includes a combination of a color conversion, a rotation, and a scaling, wherein the transformation is performed in a single loop on the image data and wherein, during the color conversion, the received image is converted the image from YUV color space to RGB color space by pixel location coordinates in the RGB color space provided to a rotation module for rotating the received image prior to a scaling operation performed by a scaling module for scaling the received image; and write the transformed image data to the cache memory; and a rendering module for rendering the transformed image data to be displayed.

11. The system of claim 10, wherein the image processing application further includes a codec for decoding the received image data.

12. The system of claim 10, wherein the decoded image data is in the YUV color space and the transformed image data is in the RGB color space.

13. The system of claim 12, wherein the transformation module is configured to perform a rotation and scaling portion of the transformation using:

$$i=ax+by+c;$$

$$j=dx+ey+f;$$

where x and y are pixel location coordinates in YUV color space, i and j are pixel location coordinates in the RGB color space, and {a, b, c, d, e, f} are parameters defining a rotation angle and a scaling coefficient.

14. The system of claim 13, wherein the rotation and scaling portion of the transformation is for automatically adjusting the received image from one of a portrait presentation mode and a landscape presentation mode to another of the portrait presentation mode and the landscape presentation mode.

15. The system of claim 10, wherein the transformation module is further configured to combine at least one additional transformation operation with the color conversion, rotation, and scaling operations.

16. A computer-readable storage medium with instructions encoded thereon for optimizing rotation and scaling operations on an image, the instructions comprising:

receiving image data to be rendered on a mobile device display;

decoding the received image data;

writing the decoded image data to a cache memory;

reading the decoded image from the cache memory;

performing a transformation operation on the decoded image data that includes a combination of a color conversion, a rotation, and a scaling, wherein a rotation and scaling portion of the transformation is performed in a single loop using:

$$i=ax+by+c;$$

$$j=dx+ey+f;$$

where x and y are pixel location coordinates in YUV color space, i and j are pixel location coordinates in RGB color space, and {a, b, c, d, e, f} are parameters defining a rotation angle and a scaling coefficient;

writing the transformed image data to the cache memory; and rendering the transformed image data on the mobile device display.

17. The computer-readable storage medium of claim 16, wherein the instructions further comprise:

determining the {a, b, c, d, e, f} parameters automatically based on a size, resolution, and an orientation of the mobile device display.

18. The computer-readable storage medium of claim 16, wherein the image data is for one of: a still image and a video stream frame.

19. The computer-readable storage medium of claim 16, wherein the instructions further comprise:

performing at least one additional transformation operation in combination with the color conversion, rotation, and scaling operations.

* * * * *